(12) United States Patent
Sakurai

(10) Patent No.: US 8,450,406 B2
(45) Date of Patent: May 28, 2013

(54) ORGANIC-INORGANIC HYBRID MATERIAL AND ITS SHAPED ARTICLE, OPTICAL COMPONENT AND LENS

(75) Inventor: Seiya Sakurai, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/998,205

(22) PCT Filed: Sep. 25, 2009

(86) PCT No.: PCT/JP2009/067196
§ 371 (c)(1), (2), (4) Date: May 11, 2011

(87) PCT Pub. No.: WO2010/035897
PCT Pub. Date: Apr. 1, 2010

(65) Prior Publication Data
US 2011/0213093 A1    Sep. 1, 2011

(30) Foreign Application Priority Data
Sep. 26, 2008   (JP) .................. 2008-247150

(51) Int. Cl.
C08K 3/22   (2006.01)
C08F 6/12   (2006.01)
C08F 232/04 (2006.01)

(52) U.S. Cl.
USPC ........... 524/413; 524/432; 524/437; 524/547; 524/553; 977/779

(58) Field of Classification Search
USPC ........... 524/547, 553, 413, 432, 437; 977/779
See application file for complete search history.

(56) References Cited

U.S. PATENT DOCUMENTS
2007/0265381 A1   11/2007  Kikuchi

FOREIGN PATENT DOCUMENTS
| JP | 2001-181349 | 7/2001 |
| JP | 2002-020435 | 1/2002 |
| JP | 2003-73564 | 3/2003 |
| JP | 2006-312706 | 11/2006 |
| JP | 2007-238929 | 9/2007 |
| WO | WO 2006/049015 A1 | 5/2006 |

OTHER PUBLICATIONS

Machine translation of JP 2006-312706A; publication date: Nov. 2006.*
Machine translation of JP 2002-020435A; publication date: Jan. 2002.*
Machine translation of JP 2001-181349A; publication date: Jul. 2001.*

* cited by examiner

Primary Examiner — Fred M Teskin
(74) Attorney, Agent, or Firm — Jean C. Edwards, Esq.; Edwards Neils PLLC

(57) ABSTRACT

An organic-inorganic hybrid material containing inorganic fine particles and a thermoplastic resin having recurring units of the following formulae (1) and (2):

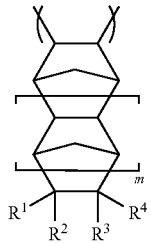

Formula (1)

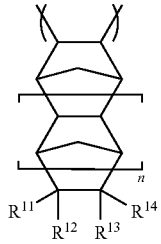

Formula (2)

wherein $R^1$ to $R^4$ and $R^{11}$ to $R^{14}$ represent hydrogen, alkyl, aryl, —$COOR^5$ or —$OCOR^5$ provided that at least one of $R^{11}$ to $R^{14}$ is -L-X; L represents single bond or divalent linking group; X represents a functional group capable of bonding to inorganic fine particles; $R^5$ represents alkyl or aryl; and m and n indicate 0 or 1.

16 Claims, No Drawings

ORGANIC-INORGANIC HYBRID MATERIAL AND ITS SHAPED ARTICLE, OPTICAL COMPONENT AND LENS

CROSS-REFERENCE TO RELATED APPLICATIONS

The present invention is a 35 U.S.C. 371 National Stage Entry of PCT/JP2009/067196, filed Sep. 25, 2009, which claims priority from Japanese Patent Application No. 2008-247150, filed on Sep. 26, 2008, the contents of which are all herein incorporated by reference.

TECHNICAL FIELD

The present invention relates to an organic-inorganic hybrid material excellent in high refractivity, transparency, lightweightness and workability and excellent in releasability from mold, and to optical components such as lens substrates comprising the material (e.g., lenses for spectacles, lenses for optical instruments, lenses for optoelectronics, laser lenses, pickup lenses, in-vehicle camera lenses, mobile camera lenses, digital camera lenses, OHP lenses, lenses constituting microlens arrays), etc.

BACKGROUND ART

As compared with glass, a transparent resin material has various advantages in that it is excellent in lightweightness, impact resistance and shapability and is economical; and recently, resin is being much used for optical glass in the art of optical components such as lenses and others.

One typical transparent thermoplastic resin material is a polycarbonate resin. In particular, a polycarbonate resin produced by the use of 2,2-bis(4-hydroxyphenyl)propane (generally called bisphenol A) as a starting material has many advantages in that it is excellent in transparency, more lightweight than glass and excellent in impact resistance and that it is applicable to industrial-scale mass-production of shaped articles as being able to be shaped in melt; and therefore the resin of the type is being much used as optical components in various fields. The resin has a relatively high refractive index of 1.58 or so, but its Abbe's number indicating the degree of refractivity dispersiveness is around 30 and is low, or that is, the resin is poor in the balance between the refractivity and the dispersiveness characteristic thereof. At present, therefore, the resin is limited in point of the range of its applications to optical components. For example, regarding lenses for spectacles that are one typical example of optical components, it is known that the materials for those lenses preferably have an Abbe's number of at least 40 when the visibility function thereof is taken into consideration (Quarterly Journal of Chemical Review, No. 39, Refractivity Control of Transparent Polymer, edited by the Chemical Society of Japan); and in case where a polycarbonate resin produced by the use of bisphenol A as a starting material is directly used for those lenses as it is, the lenses formed of the resin could hardly have the desired characteristics.

JP-A 2003-73564 reports a technique of dispersing inorganic fine particles having a high refractive index in a resin matrix having an alicyclic structure and having a high Abbe's number, thereby realizing an organic-inorganic hybrid material having an increased refractive index. In this, however, the transparency and the strength of the resin may be lowered, and the material produced therein could not be said to be always sufficient in practical use.

JP-A 2007-238929 describes an organic-inorganic hybrid material comprising inorganic fine particles and a thermoplastic resin having a functional group capable of forming a chemical bond with inorganic fine particles, and the material satisfies both high refractivity and good transparency. However, the technique is not always sufficient in practical use in that the organic-inorganic hybrid material produced could not satisfy both good heat resistance and a high Abbe's number.

Recently, the releasability from mold in molding an organic-inorganic hybrid material therein has brought about a new problem in the art. In an organic-inorganic hybrid material, the organic material has a functional group so as to promote the adsorbability thereof to the inorganic material and the dispersibility thereof in the formed material. Accordingly, the functional group in the organic material often closely adheres to the mold where the hybrid material is molded, therefore bringing about a problem in that the molded article may be scratched when it is released from the mold. From this viewpoint, the mold releasability of the hybrid material is a serious point. At present, however, no one has succeeded in developing an organic-inorganic hybrid material capable of completely solving the problem of mold releasability thereof on a practical level.

Accordingly, no one knows a thermoplastic material which satisfies all the requirements of high refractivity, low dispersiveness (high Abbe's number), heat resistance, transparency and lightweightness, of which the refractive index can be controlled in any desired manner, and which is excellent in the releasability from mold, and optical components comprising the material; and it is earnestly desired to develop them.

SUMMARY OF THE INVENTION

The present invention has been made in consideration of the above-mentioned current situation in the art, and its object is to provide an organic-inorganic hybrid material which comprises inorganic fine particles dispersed in an organic matrix and which has high refractivity, low dispersiveness (high Abbe's number), heat resistance and good transparency and has good releasability from mold, and to provide its shaped article, as well as an optical component and a lens comprising the material.

The present inventors have assiduously studied for the purpose of attaining the above-mentioned object, and as a result, have found that an organic-inorganic hybrid material comprising a thermoplastic resin having a specific molecular structure and inorganic fine particles has high refractivity, low dispersiveness (high Abbe's number), heat resistance and good transparency and has good releasability from mold, and have completed the invention described below.

[1] An organic-inorganic hybrid material containing inorganic fine particles and a thermoplastic resin, wherein the thermoplastic resin contains both recurring units of the following formulae (1) and (2):

Formula (1)

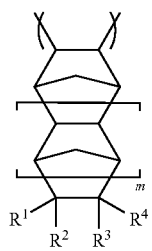

wherein $R^1$ to $R^4$ each independently represent a hydrogen atom, a substituted or unsubstituted alkyl group, a substituted or unsubstituted aryl group, or a substituent of —COOR$^5$ or —OCOR$^5$;

$R^5$ represents a substituted or unsubstituted alkyl group, or a substituted or unsubstituted aryl group;

at least two of $R^1$ to $R^4$ may bond to each other to form an alkylidene group or a monocyclic or polycyclic ring;

m indicates 0 or 1;

Formula (2)

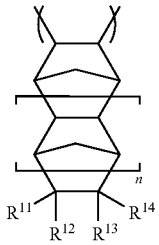

wherein $R^{11}$ to $R^{14}$ each independently represent a hydrogen atom, a substituted or unsubstituted alkyl group, a substituted or unsubstituted aryl group, a substituent of —COOR$^{15}$ or —OCOR$^{15}$, or a substituent of -L-X, and at least one of $R^{11}$ to $R^{14}$ is -L-X;

$R^{15}$ represents a substituted or unsubstituted alkyl group, or a substituted or unsubstituted aryl group;

L represents a single bond or a divalent linking group;

X represents a functional group capable of bonding to inorganic fine particles;

at least two of $R^{11}$ to $R^{14}$ may bond to each other to form an alkylidene group or a monocyclic or polycyclic ring; and n indicates 0 or 1.

[2] The organic-inorganic hybrid material of [1], wherein the functional group capable of bonding to inorganic fine particles is a group selected from the group consisting of

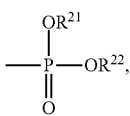

—SO$_3$H, —OSO$_3$H, —COOH, a metal alkoxide group, —OH, —NH$_2$, —SH, —COOCO—, a group having an ether bond-containing cyclic structure, and a salt thereof, and wherein $R^{21}$ and $R^{22}$ each independently represent a hydrogen atom, a substituted or unsubstituted alkyl group, or a substituted or unsubstituted aryl group.

[3] The organic-inorganic hybrid material of [1] or [2], wherein the functional group capable of bonding to inorganic fine particles is a group selected from the group consisting of —COOH, —SO$_3$H, —PO(OH)$_2$, and a salt thereof.

[4] The organic-inorganic hybrid material of any one of [1] to [3], wherein the weight-average molecular weight of the thermoplastic resin is at least 50,000.

[5] The organic-inorganic hybrid material of any one of [1] to [4], wherein the mean primary particle size of the inorganic fine particles is from 1 to 15 nm.

[6] The organic-inorganic hybrid material of any one of [1] to [5], wherein the inorganic fine particles are fine particles containing zirconium oxide, aluminum oxide, zinc oxide or titanium oxide.

[7] The organic-inorganic hybrid material of any one of [1] to [6], which contains the inorganic fine particles in an amount of at least 10% by mass of the organic-inorganic hybrid material.

[8] The organic-inorganic hybrid material of any one of [1] to [7], of which the light transmittance at a wavelength of 589 nm through a thickness thereof of 1 mm is at least 50%.

[9] The organic-inorganic hybrid material of any one of [1] to [8], of which the refractive index at a wavelength of 589 nm is at least 1.55.

[10] The organic-inorganic hybrid material of any one of [1] to [9], of which the Abbe's number is at least 40.

[11] A shaped article formed by shaping the organic-inorganic hybrid material of any one of [1] to [10].

[12] An optical component formed by shaping the organic-inorganic hybrid material of any one of [1] to [10].

[13] A lens formed by shaping the organic-inorganic hybrid material of any one of [1] to [10].

According to the invention, there is provided an organic-inorganic hybrid material having high refractivity, low dispersiveness (high Abbe's number), heat resistance and good transparency and having good releasability from mold. The organic-inorganic hybrid material of the invention is readily shaped into shaped articles such as typically lens substrates and other optical components, and in particular, when the material is thermoplastic, it can be extremely readily shaped. The shaped articles formed of the organic-inorganic hybrid material of the invention have excellent transparency and have high refractivity and a high Abbe's number.

MODES FOR CARRYING OUT THE INVENTION

The organic-inorganic hybrid material of the invention and shaped articles such as lens substrates and others comprising the material are described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Organic-Inorganic Hybrid Material]

The organic-inorganic hybrid material of the invention comprises inorganic fine particles and a thermoplastic resin containing both recurring units of the above-mentioned formulae (1) and (2).

Preferably, the organic-inorganic hybrid material of the invention is solid. Preferably, the solvent content of the organic-inorganic hybrid material is at most 5% by mass, more preferably at most 2% by mass, even more preferably at most 1% by mass. Most preferably, the material does not contain a solvent.

Preferably, the refractive index at a wavelength of 589 nm of the organic-inorganic hybrid material of the invention is at least 1.55, more preferably at least 1.565, even more preferably at least 1.575.

The Abbe's number (υD) of the organic-inorganic hybrid material of the invention may be computed according to the following formula (A), in which the refractive indices nD, nF and nC of the material at a wavelength of 589 nm, 486 nm and 656 nm, respectively, are measured. Preferably, the Abbe's number (υD) of the hybrid material is at least 40, more preferably at least 45, even more preferably at least 50, still more preferably at least 55.

$$υD=(nD-1)/(nF-nC) \qquad (A)$$

Preferably, the light transmittance at a wavelength of 589 nm of the organic-inorganic hybrid material of the invention through a thickness thereof of 1 mm is at least 50%, more preferably at least 60%, even more preferably at least 70%, still more preferably at least 80%. Also preferably, the light transmittance at a wavelength of 405 nm of the hybrid material through a thickness thereof of 1 mm is at least 50%, more preferably at least 60%, even more preferably at least 70%. The hybrid material of which the light transmittance at a wavelength of 589 nm through a thickness thereof of 1 mm is at least 70% may readily give lens substrates having preferred properties. The light transmittance of the organic-inorganic hybrid material of the invention through a thickness thereof of 1 mm is a value measured by shaping the hybrid material into a plate having a thickness of 1.0 mm, and analyzing it with a UV-visible light absorption spectrometer (Shimadzu's UV-3100).

Preferably, the organic-inorganic hybrid material of the invention has a glass transition temperature of from 100° C. to 400° C., more preferably from 130° C. to 300° C., even more preferably from 150° C. to 270° C. The hybrid material having a glass transition temperature of not lower than 100° C. may have good heat resistance; and the hybrid material having a glass transition temperature of not higher than 400° C. is easy to shape and work.

The organic-inorganic hybrid material of the invention is preferably thermoplastic from the viewpoint of the shapability thereof, and especially the shaping time for the thermoplastic hybrid material can be shortened and the shaping accuracy of the shaped article can be increased.

The thermoplastic material and the inorganic fine particles that are the indispensable constitutive components of the organic-inorganic hybrid material of the invention are described below individually. Not contradictory to the subject matter and the spirit of the invention, the organic-inorganic hybrid material of the invention may contain any other resin not falling within the scope of the specific resin for use in the invention and also additives such as dispersant, plasticizer, release agent and others except these indispensable constitutive components.

(Thermoplastic Resin)

The thermoplastic resin for use in the organic-inorganic hybrid material of the invention is a copolymer containing both recurring units of the following formulae (1) and (2). The recurring units of the formulae (1) and (2) are described below.

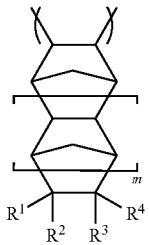

Formula (1)

In the formula (1), $R^1$ to $R^4$ each independently represent a hydrogen atom, a substituted or unsubstituted alkyl group, a substituted or unsubstituted aryl group, or a substituent of —COOR$^5$ or —OCOR$^5$. In this, $R^5$ represents a substituted or unsubstituted alkyl group, or a substituted or unsubstituted aryl group. At least two of $R^1$ to $R^4$ may bond to each other to form an alkylidene group or a monocyclic or polycyclic ring.

m indicates 0 or 1. In this description, the alkylidene group has a double bond and is preferably represented by =CR$^6$R$^7$ wherein $R^6$ and $R^7$ each independently represent an alkyl group.

More preferably, at least two of $R^1$ to $R^4$ bond to each other to form an alkylidene group, or a monocyclic ring having a structure except the recurring unit structure indicated by m, or a polycyclic ring having a structure except the recurring unit structure indicated by m.

The embodiment where at least two of $R^1$ to $R^4$ bond to each other to form an alkylidene group or a monocyclic or polycyclic ring includes, for example, a case where $R^1$ and $R^2$ bond to each other to form an alkylidene group or a monocyclic or polycyclic ring, a case where $R^2$ and $R^3$ bond to each other to form a monocyclic or polycyclic ring, and a case where $R^3$ and $R^4$ bond to each other to form an alkylidene group or a monocyclic or polycyclic ring. The structure of the alkylidene group is not specifically defined, and the structure of the monocyclic or polycyclic ring is not also specifically defined; preferably, however, the structure is any other than the recurring unit structure indicated by m.

Even more preferably in the formula (1), $R^1$ to $R^4$ each independently represent a hydrogen atom, a substituted or unsubstituted alkyl group, a substituted or unsubstituted aryl group, or a substituent of —COOR$^5$ or —OCOR$^5$; $R^5$ represents a substituted or unsubstituted alkyl group, or a substituted or unsubstituted aryl group; and m indicates 0 or 1.

In the formula (1), the substituted or unsubstituted alkyl group for $R^1$ to $R^5$ preferably has from 1 to 30 carbon atoms, more preferably from 1 to 20 carbon atoms, and includes, for example, a methyl group, an ethyl group, an n-propyl group. The substituted alkyl group includes an aralkyl group. The aralkyl group preferably has from 7 to 30 carbon atoms, more preferably from 7 to 20 carbon atoms, and includes, for example, a benzyl group, a p-methoxybenzyl group. In addition, a hydroxyalkyl group (e.g., hydroxyethyl group) and an alkoxyalkyl group (e.g., methoxyethyl group) are also within the scope of the substituted alkyl group.

The substituted or unsubstituted aryl group for $R^1$ to $R^5$ preferably has from 6 to 30 carbon atoms, more preferably from 6 to 20 carbon atoms, and includes, for example, a phenyl group, a 2,4,6-tribromophenyl group, a 1-naphthyl group. The aryl group includes a heteroaryl group. The substituent for the alkyl group and the substituent for the aryl group include those alkyl group and aryl group, and in addition, a halogen atom (e.g., fluorine atom, chlorine atom, bromine atom, iodine atom), an alkoxy group (e.g., methoxy group, ethoxy group), etc.

m is preferably 0 or 1.

Specific examples of the recurring unit of the formula (1) are shown below, to which, however, the invention should not be limited.

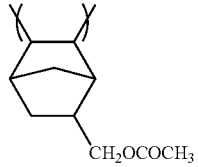 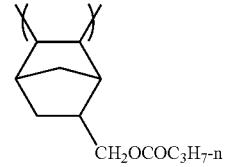

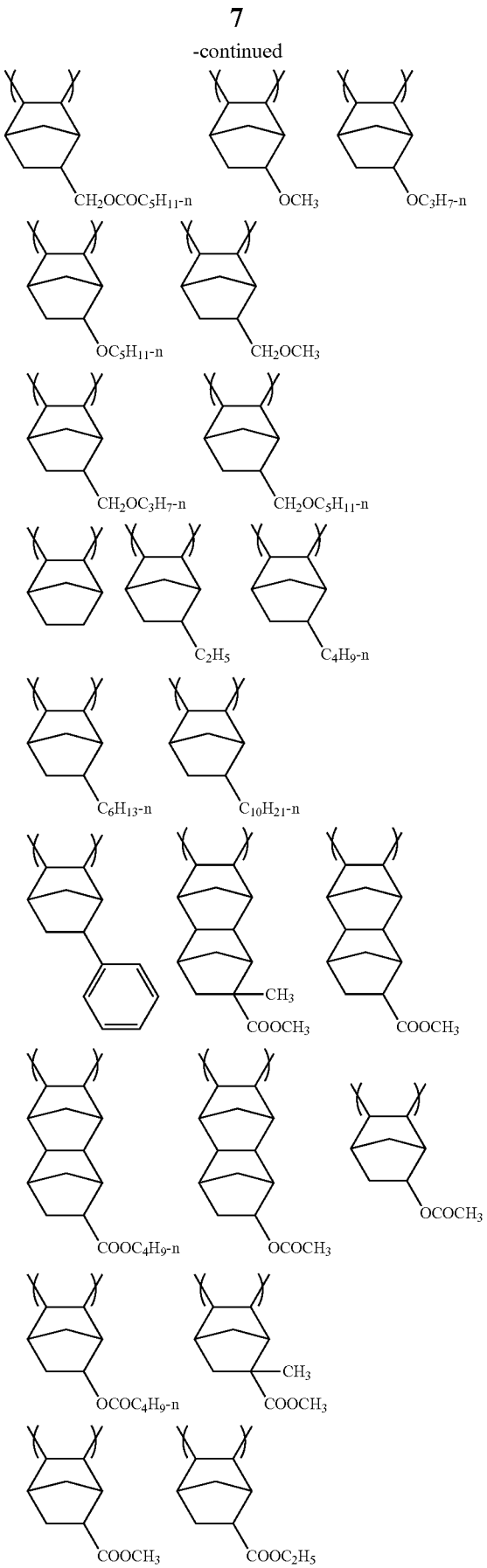

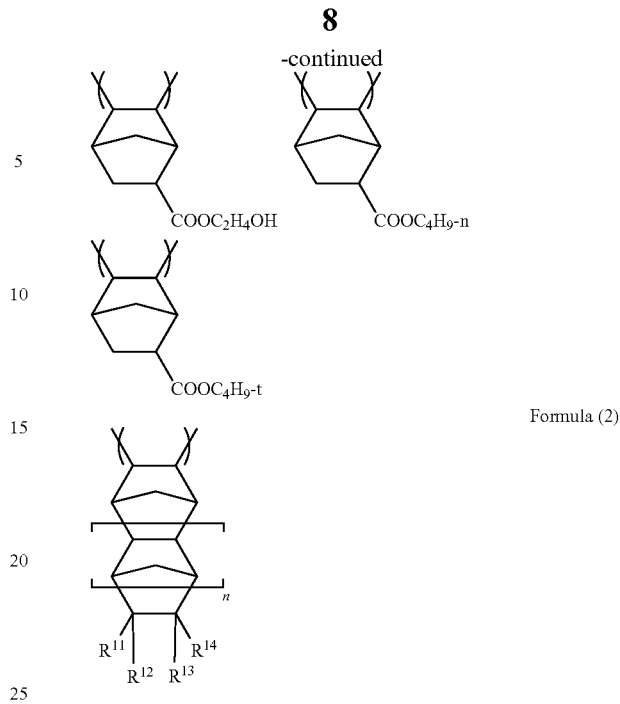

Formula (2)

In the formula (2), $R^{11}$ to $R^{14}$ each independently represent a hydrogen atom, a substituted or unsubstituted alkyl group, a substituted or unsubstituted aryl group, a substituent of —COOR$^5$ or —OCOR$^5$, or a substituent of -L-X, and at least one of $R^{11}$ to $R^{14}$ is -L-X. In this, $R^{15}$ represents a substituted or unsubstituted alkyl group, or a substituted or unsubstituted aryl group; L represents a single bond or a divalent linking group; X represents a functional group capable of bonding to inorganic fine particles. At least two of $R^{11}$ to $R^{14}$ may bond to each other to form an alkylidene group or a monocyclic or polycyclic ring. n indicates 0 or 1.

More preferably, at least two of $R^{11}$ to $R^{14}$ bond to each other to form an alkylidene group, or a monocyclic ring having a structure except the recurring unit structure indicated by n, or a polycyclic ring having a structure except the recurring unit structure indicated by n.

The embodiment where at least two of $R^{11}$ to $R^{14}$ bond to each other to form an alkylidene group or a monocyclic or polycyclic ring includes, for example, a case where $R^{11}$ and $R^{12}$ bond to each other to form an alkylidene group or a monocyclic or polycyclic ring, a case where $R^{12}$ and $R^{13}$ bond to each other to form a monocyclic or polycyclic ring, and a case where $R^{13}$ and $R^{14}$ bond to each other to form an alkylidene group or a monocyclic or polycyclic ring. The structure of the alkylidene group is not specifically defined, and the structure of the monocyclic or polycyclic ring is not also specifically defined; preferably, however, the structure is any other than the recurring unit structure indicated by n.

Even more preferably in the formula (2), $R^{11}$ to $R^{14}$ each independently represent a hydrogen atom, a substituted or unsubstituted alkyl group, a substituted or unsubstituted aryl group, a substituent of —COOR$^5$ or —OCOR$^5$, or a substituent of -L-X; at least any one of $R^{11}$ to $R^{14}$ is -L-X; $R^5$ represents a substituted or unsubstituted alkyl group, or a substituted or unsubstituted aryl group; L represents a single bond or a divalent linking group; X represents a functional group capable of bonding to inorganic fine particles; at least two of $R^{11}$ to $R^{14}$ may bond to each other to form a ring containing —O—, —CO— or both the two; and n indicates 0 or 1.

In the formula (2), the alkyl group for $R^{11}$ to $R^{15}$ preferably has from 1 to 30 carbon atoms, more preferably from 1 to 20 carbon atoms, and includes, for example, a methyl group, an ethyl group, an n-propyl group. The substituted alkyl group includes an aralkyl group. The aralkyl group preferably has from 7 to 30 carbon atoms, more preferably from 7 to 20 carbon atoms, and includes, for example, a benzyl group, a p-methoxybenzyl group. In addition, a hydroxyalkyl group (e.g., hydroxyethyl group) and an alkoxyalkyl group (e.g., methoxyethyl group) are also within the scope of the substituted alkyl group.

The aryl group for $R^{11}$ to $R^{15}$ preferably has from 6 to 30 carbon atoms, more preferably from 6 to 20 carbon atoms, and includes, for example, a phenyl group, a 2,4,6-tribromophenyl group, a 1-naphthyl group. The aryl group includes a heteroaryl group. The substituent for the alkyl group and the substituent for the aryl group include those alkyl group, alkenyl group, alkynyl group and aryl group, and in addition, a halogen atom (e.g., fluorine atom, chlorine atom, bromine atom, iodine atom), an alkoxy group (e.g., methoxy group, ethoxy group), etc.

n is preferably 0 or 1.

In the formula (2), L represents a single bond or a divalent linking group. Preferred examples of the divalent linking group include —$CO_2$—, —OCO—, —CONH—, —OCONH—, —OCOO—, —O—, —S—, —NH—, substituted or unsubstituted arylene group, alkylene group, alkyleneoxy group, alkyleneoxycarbonyl group, arylene group, aryleneoxy group, aryleneoxycarbonyl group, and their combinations. More preferably, L is a single bond, or a divalent linking group selected from —$CO_2$—, —OCO—, —OCOO—, —O—, —S—, substituted or unsubstituted arylene group, alkylene group, alkyleneoxy group, alkyleneoxycarbonyl group, arylene group, aryleneoxy group, aryleneoxycarbonyl group, or their combinations; even more preferably a single bond, or a divalent linking group selected from —$CO_2$—, —OCOO—, —OCOO—, —O—, —S—, an alkylene group, an alkyleneoxy group, an alkyleneoxycarbonyl group or their combinations.

In the formula (2), X represents a functional group capable of bonding to inorganic fine particles. "Functional group capable of bonding to inorganic fine particles" as referred to herein means a functional group capable of bonding to inorganic fine particles in a mode of covalent bonding, ionic bonding, coordination bonding or hydrogen bonding. In case where the resin has plural functional groups, they may form different chemical bonds to inorganic fine particles. The possibility of chemical bond formation may be determined as follows: In an organic solvent as in Examples to be given below, a thermoplastic resin is mixed with inorganic fine particles, and the mixture is checked for the possibility as to whether or not the functional group in the thermoplastic resin could form a chemical bond to the inorganic fine particles. In the organic-inorganic hybrid material of the invention, all of the functional groups in the thermoplastic group may form a chemical bond to inorganic fine particles, or a part of them may form a chemical bond to inorganic fine particles.

The functional group X capable of bonding to inorganic fine particles forms a chemical bond to inorganic fine particles, thereby exhibiting its function of stably dispersing the inorganic fine particles in the thermoplastic resin. Not specifically defined, the functional group X capable of bonding to inorganic fine particles may have any structure capable of forming a chemical bond to inorganic fine particles. X includes, for example,

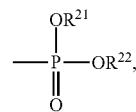

—$SO_3H$, —$OSO_3H$, —$CO_2H$, a metal alkoxide group (preferably —$Si(OR^{23})_pR^{24}_{3-p}$), —OH, —$NH_2$, —SH, etc. Also preferred are those selected from an acid anhydride group represented by —COOCO—, a functional group having an ether group-containing cyclic structure such as an epoxy group or the like, and their salts. Of those, more preferred are

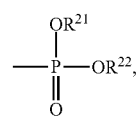

—$SO_3H$, —$CO_2H$, and —$Si(OR^{23})_pR^{24}_{3-p}$; even more preferred are

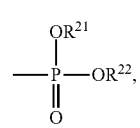

—$SO_3H$, and —$CO_2H$; and still more preferred is —$CO_2H$.

$R^{21}$ to $R^{24}$ each independently represent a hydrogen atom, a substituted or unsubstituted alkyl group, or a substituted or unsubstituted aryl group. The alkyl group preferably has from 1 to 30 carbon atoms, more preferably from 1 to 20 carbon atoms, and includes, for example, a methyl group, an ethyl group, an n-propyl group. The substituted alkyl group includes an aralkyl group. The aralkyl group preferably has from 7 to 30 carbon atoms, more preferably from 7 to 20 carbon atoms, and includes, for example, a benzyl group, a p-methoxybenzyl group. The aryl group preferably has from 6 to 30 carbon atoms, more preferably from 6 to 20 carbon atoms, and includes, for example, a phenyl group, a 2,4,6-tribromophenyl group, a 1-naphthyl group. The aryl group includes a heteroaryl group. The substituent for the alkyl group, the alkenyl group, the alkynyl group and the aryl group include those alkyl group, alkenyl group, alkynyl group and aryl group, and in addition, a halogen atom (e.g., fluorine atom, chlorine atom, bromine atom, iodine atom), an alkoxy group (e.g., methoxy group, ethoxy group), etc. Especially preferably, $R^{21}$ and $R^{22}$ are hydrogen atoms and $R^{23}$ and $R^{24}$ are methyl groups.

p indicates an integer of from 0 to 3, and is preferably 3.

Specific examples of the recurring unit of the formula (2) are shown below, to which, however, the invention should not be limited.

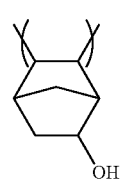 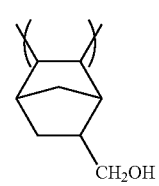 

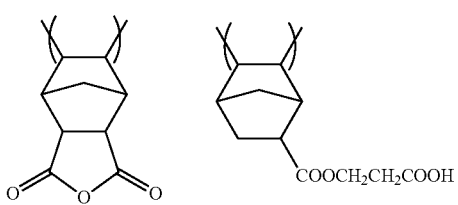
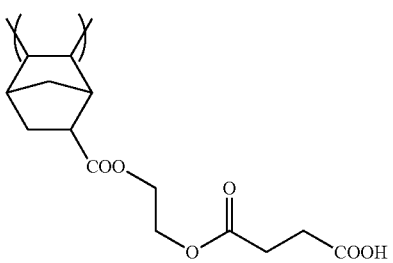
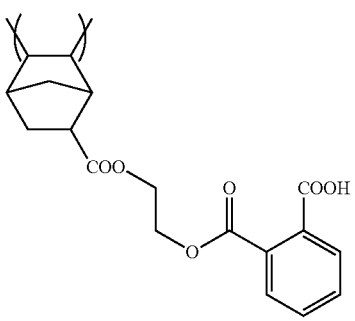
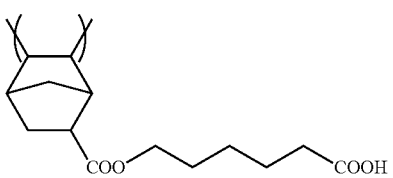
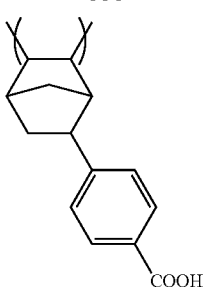
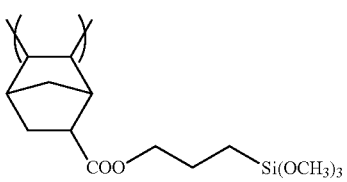
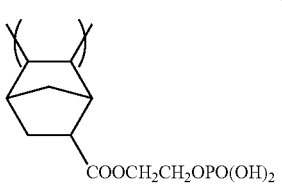

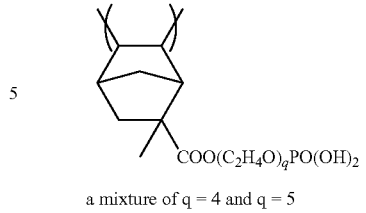

a mixture of q = 4 and q = 5

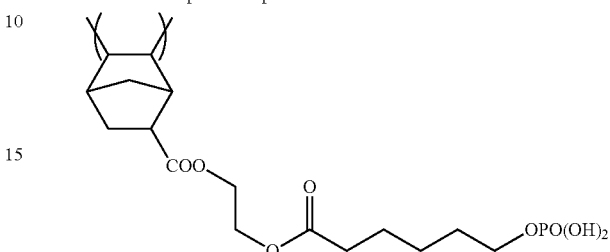
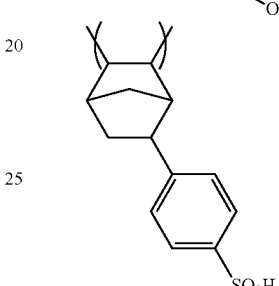
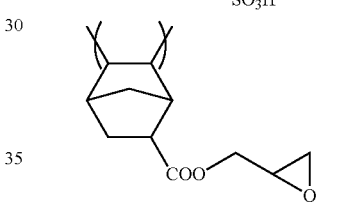

Containing both of the recurring units of the above-mentioned formulae (1) and (2), the thermoplastic resin for use in the invention may be a copolymer containing a plurality of those recurring units, and may contain any other recurring units than the recurring units of the formulae (1) and (2). The other recurring units than the recurring units of the formulae (1) and (2) may be any recurring units derived from copolymerizable vinyl compounds. Preferred examples of the vinyl compounds include ethylene, propylene; α-olefins such as 1-butene, 1-hexene, etc.; styrene, etc.

Though not indiscriminately defined as depending on the type of the functional group capable of bonding to inorganic fine groups therein, the content ratio of the recurring unit of the formula (2) in the thermoplastic resin for use in the invention is preferably from 0.1 to 20 mol %, more preferably from 0.2 to 10 mol %, even more preferably from 0.3 to 5 mol %.

The weight-average molecular weight of the thermoplastic resin (dispersive polymer) for use in the invention is preferably from 10,000 to 1,000,000, more preferably from 30,000 to 500,000, even more preferably from 50,000 to 300,000. The thermoplastic resin having a weight-average molecular weight of at most 1,000,000 may give an organic-inorganic hybrid material of good shapability and workability; and the thermoplastic resin having a weight-average molecular weight of at least 10,000 may give an organic-inorganic hybrid material having a sufficient mechanical strength.

The weight-average molecular weight may be determined through GPC under the condition mentioned below.

Apparatus: HLC-8121GPC/HT (by Tosoh),

Column: TSK$_{gel}$ GMH$_{HR}$-H(20)HT (7.8 mm×300 mm), 2 columns,

Detector: RI detector with built-in HLC-8221GPC/HT,

Solvent: o-dichlorobenzene,

Flow rate: 1 mL/min,

Temperature: 145° C.,

Sample amount: 500 μL (0.2% solution),

Standard sample: monodispersed polystyrene×16 (by Tosoh).

Preferably, the number of the functional groups capable of bonding to inorganic fine particles in the thermoplastic resin for use in the invention is from 0.1 to 20 in one polymer chain on average, more preferably from 0.5 to 10, even more preferably from 1 to 5. The thermoplastic resin in which the number of the functional groups is at most 20 in one polymer chain on average may readily coordinate with plural inorganic fine particles thereby preventing the viscosity of the hybrid material in the form of solution from increasing and preventing the material from gelling. The thermoplastic resin in which the number of the functional groups is least 0.1 in one polymer chain on average may stably disperse inorganic fine particles therein with ease.

Preferably, the glass transition temperature of the thermoplastic resin for use in the invention is from 100° C. to 400° C., more preferably from 130° C. to 300° C. The resin having a glass transition temperature of not lower than 100° C. may readily give optical components having sufficient heat resistance; and the resin having a glass transition temperature of not higher than 400° C. may readily give a hybrid material of good shapability and workability.

In case where the refractivity difference between a thermoplastic resin and inorganic fine particles is large, then the hybrid material of the two may often have Rayleigh scattering occurring thereon; and in such a case, therefore, the amount of the fine particles that may be mixed with the thermoplastic resin to give a transparent hybrid material shall be small. Preferably, the refractive index of the thermoplastic resin for use in the invention is at least 1.48, more preferably at least 1.52, even more preferably at least 1.53. The refractive index is a value measured at 22° C. and at a wavelength of 589 nm.

Preferably, the light transmittance of the thermoplastic resin for use in the invention at a wavelength of 589 nm through a thickness thereof of 1 mm is at least 80%, more preferably at least 85%, even more preferably at least 88%.

Preferred examples of the thermoplastic resin for use in the invention are shown below, to which, however, the invention should not be limited.

P-1

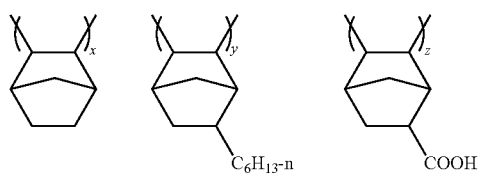

x/y/z = 63/35/2 mol %
Mw = 170,000

P-2

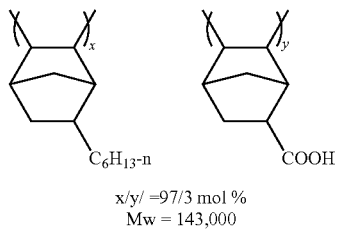

x/y/ =97/3 mol %
Mw = 143,000

P-3

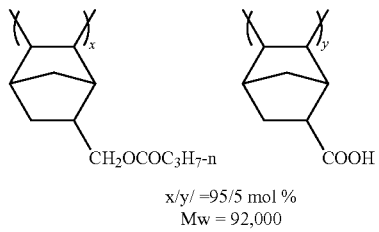

x/y/ =95/5 mol %
Mw = 92,000

P-4

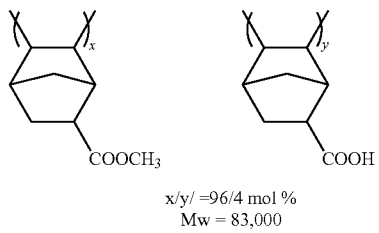

x/y/ =96/4 mol %
Mw = 83,000

P-5

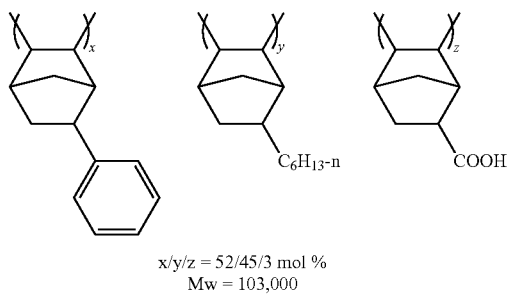

x/y/z = 52/45/3 mol %
Mw = 103,000

P-6

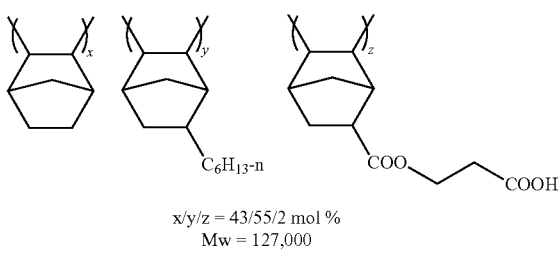

x/y/z = 43/55/2 mol %
Mw = 127,000

P-7

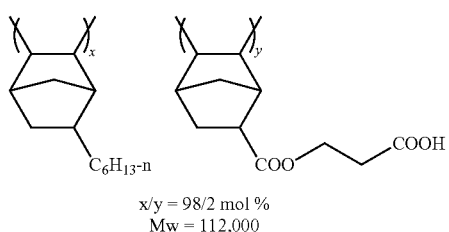

x/y = 98/2 mol %
Mw = 112,000

P-8

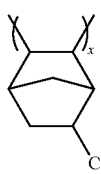 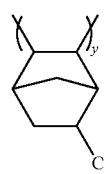

CH₂OCOC₃H₇-n    COOCH₂CH₂OPO(OH)₂ x/y = 98/2 mol %
Mw = 132,000

P-9

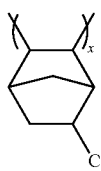 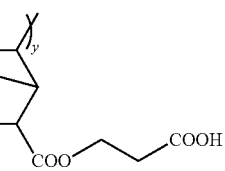

COOCH₃    COO⌢COOH x/y = 95/5 mol %
Mw = 91,000

P-10

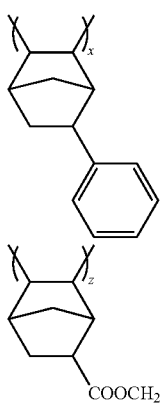

COOCH₂CH₂OPO(OH)₂ x/y/z = 33/65/2 mol %
Mw = 88,000

One or more different types of the above-mentioned thermoplastic resins may be used either singly or as combined, in the organic-inorganic hybrid material of the invention.

The organic-inorganic hybrid material of the invention may contain any other resin than the specific thermoplastic resin in the invention.

(Inorganic Fine Particles)

The inorganic fine particles for use in the organic-inorganic hybrid material of the invention are not specifically defined, for which, for example, usable are fine particles described in JP-A 2002-241612, 2005-298717, 2006-70069.

As the inorganic fine particles for use in the invention, concretely mentioned are oxide fine particles (e.g., aluminum oxide, titanium oxide, niobium oxide, zirconium oxide, magnesium oxide, tellurium oxide, yttrium oxide, indium oxide, tantalum oxide, hafnium oxide, bismuth oxide, tin oxide, etc.), composite oxide fine particles (e.g., lithium niobate, potassium niobate, lithium tantalate, potssium tantalate, barium titanate, strontium titanate, lead titanate, barium zirconate, barium stannate, zircon, etc.), IIb-VIb semiconductors (e.g., Zn or Cd chalcogenides (S, Se, Te) or oxides, etc.), zinc sulfide fine particles, etc., to which, however, the invention should not be limited. Of those, especially preferred are metal oxide fine particles, in particular, at least one selected from a group consisting of zirconium oxide, aluminum oxide, zinc oxide, tin oxide and titanium oxide. More preferred is at least one selected from a group consisting of zirconium oxide, aluminum oxide, zinc oxide and titanium oxide; even more preferred are zirconium oxide or aluminum oxide fine particles as having good visible range transparency and having low photocatalyst activity. In the invention, also usable are composites of those inorganic materials from the viewpoint of the refractivity, the transparency and the stability thereof. For various purposes of photocatalyst activity reduction and water absorption reduction, the fine particles may be doped with a different element, or their surface layer may be coated with a different metal oxide such as silica, alumina or the like, or they may be surface-modified with a silane coupling agent, a titanate coupling agent or the like.

Two or more different types of inorganic fine particles may be used herein, as combined.

The inorganic fine particles for use in the invention may be a composite of plural ingredients, from the viewpoint of the refractivity, the transparency and the stability thereof. The latitude in selecting the inorganic fine particles for use in the invention may be broad. For example, when titanium oxide or the like is used, then it may be doped with a different element, or its surface layer may be coated with a different metal oxide such as silica, alumina or the like, or it may be surface-modified with a silane coupling agent, a titanate coupling agent, an aluminate coupling agent, an organic acid (e.g., carboxylic acid, sulfonic acid, phosphoric acid, phosphinic acid, etc.), a dispersion medium having an organic acid group or the like, for various purposes of photocatalyst activity reduction and water absorption reduction. Depending on the object, two or more of these may be combined for use in the invention. For example, preferred are fine particles of tin-containing rutile-type titanium oxide coated with zirconium oxide.

The production method for the inorganic fine particles for use in the invention is not specifically defined, and the particles may be produced in any known method. For example, a starting material of a metal halide or a metal alkoxide may be hydrolyzed in a water-containing reaction system to give the desired oxide fine particles. The details of the method are described, for example, in "Japanese Journal of Applied Physics", Vol. 37, pp. 4603-4608 (1998) or "Langmuir", Vol. 16, No. 1, pp. 241-246 (2000).

In use of those inorganic fine particles produced in the water-containing reaction system, water may have some negative influence on the dispersion. In such a case, therefore, water in the inorganic fine particles produced may be substituted with any other suitable organic solvent. If desired, a suitable dispersion medium may be used in uniformly dispersing the particles of the type, not detracting from the dispersibility of the particles.

Concretely, for producing zirconium oxide fine particles and their suspension, known are a method comprising neutralizing an aqueous solution containing a zirconium salt with an alkali to give zirconium hydrate, then drying and firing it, and dispersing it in a solvent to give a zirconium oxide suspension; a method comprising hydrolyzing an aqueous solution containing a zirconium salt to give a zirconium oxide suspension; a method comprising hydrolyzing an aqueous solution containing a zirconium salt to give a zirconium oxide suspension followed by filtering it in a mode of ultrafiltration; a method comprising hydrolyzing a zirconium oxide to give a zirconium oxide suspension; a method comprising heat-treating an aqueous solution containing a zirconium salt under hydrothermal pressure to give a zirconium oxide suspension, etc. Any of these methods is employable herein.

As an example of the starting material for production of titanium oxide fine particles, there is mentioned titanyl sulfate; and as an example of the starting material for production of zinc oxide nanoparticles, there is mentioned a zinc salt such as zinc acetate, zinc nitrate, etc. Metal alkoxides such as tetraethoxysilane, titanium tetraisopropoxide and the like are also preferred for the starting material for inorganic fine particles. For production of these inorganic fine particles, for example, there may be mentioned the methods descried in "Japanese Journal of Applied Physics", Vol. 37, pp. 4603-4608 (1998) or "Langmuir", Vol. 16, No. 1, pp. 241-246 (2000).

In particular, in case where oxide nanoparticles are produced according to a sol formation method, for example, employable is a process comprising giving a hydroxide or the like as a precursor, and then condensing it through dehydration or peptizing it with an acid or an alkali to give a hydrosol, like that for production of titanium oxide nanoparticles using titanyl sulfate as the starting material. In the process of forming a precursor, preferably, the precursor is isolated and purified in any desired method of filtration, centrifugation or the like, as increasing the purity of the final product. A suitable surfactant such as sodium dodecylbenzenesulfonate (abbreviated as DBS), dialkylsulfosuccinate monosodium salt (Sanyo Chemical Industries' trade name "Eleminol JS-2") or the like may be added to the obtained hydrosol, to thereby make the sol particles insoluble in water, and then the particles may be isolated. For this, for example, employable are the known methods described in "Colorants", Vol. 57, No. 6, pp. 305-308 (1984).

Apart from the method of hydrolysis in water, employable is a method of producing inorganic fine particles in an organic solvent. In the method, the organic solvent may contain the specific thermoplastic resin for use in the invention, dissolved therein. In this case, if desired, various surface-treating agents (hereinafter referred to as "dispersant", including, e.g., silane coupling agents, aluminate coupling agents, titanate coupling agents, organic acids (e.g., carboxylic acids, sulfones, sulfonic acids)) may exist in the reaction system.

Examples of the solvent for use in these methods include acetone, 2-butanone, dichloromethane, chloroform, toluene, ethyl acetate, cyclohexanone, anisole, etc. One or more of these may be used either singly or as combined.

In case where the inorganic particles are produced in a solution, the characteristics, the particle size and the coagulation condition of the inorganic particles to be produced differ depending on the temperature at which the particles are produced, and therefore, it is important to determine suitable conditions for the production. However, under normal pressure, it is impossible to produce the particles at a temperature not lower than the boiling point of the solution. In case where the particles must be produced at a higher temperature owing to their characteristics, for example, the particles may be produced under high pressure, using a pressure container such as an autoclave, thereby making them have the necessary characteristics.

Apart from the production method in a liquid phase alone of the inorganic fine particles as in the above, the production method of the particles may additionally include a firing step for treatment at a higher temperature. The firing step may be for increasing the degree of crystallinity of the fine particles produced in a liquid phase; or the starting material may be directly reacted to produce the fine particles in the firing step; or a precursor of the fine particles may be produced in a liquid phase, and this may be further processed in a firing step to produce the intended fine particles. An example of the firing process is described in JP-A 2003-19427, which comprises dissolving starting ingredients for inorganic fine particles along with other inorganic compounds, spraying the resulting solution for thermal decomposition to give particles, then washing them to remove the inorganic compounds from the inorganic fine particles; and the method is for producing particles of high crystallinity.

JP-A 2006-16236 discloses a method comprising forming a precursor of particles in a liquid phase and then crystallizing it through firing with preventing the aggregation of the formed particles in the presence of an inorganic salt.

Further mentioned are vapor-phase production methods according to a vacuum process such as a molecular beam epitaxial process or a CVD process, for example, various ordinary production methods for fine particles as in JP-A 2006-70069.

The degree of crystallinity of inorganic fine particles varies depending on the production conditions; and inorganic particles of any crystallinity can be used in the invention in accordance with the situation. The particles for use herein may be crystalline particles showing definite peaks in analysis through XRD, or amorphous particles showing broad halos in such analysis. In general, inorganic fine particles having a high degree of crystallinity have a higher refractive index than those having a low degree of crystallinity, and are therefore advantageous for application to high-refractivity materials. However, for example, in case of a material having a high photocatalytic activity such as titanium oxide, it is known that the photocatalytic activity of the material can be reduced by lowering the degree of crystallinity thereof. The photocatalytic activity of inorganic fine particles may cause a serious problem in that, when the organic-inorganic hybrid material comprising the particles is irradiated with light, then the rein is decomposed. In such a case, inorganic nanoparticles having a low degree of crystallinity may be used to lower the photocatalytic activity of the hybrid material.

In case where the inorganic fine particles have a core/shell structure, the degree of crystallinity of the core part may be the same as or different from the degree of crystallinity of the shell part. The combination of the core part and the shell part may be physically determined depending on the crystal structure, the lattice constant and other parameters of the particles; however, the core/shell combination may be artificially designed by varying the production condition. The core and the shell must be so combined that they may effectively exhibit their characteristics in the combined structure.

Regarding the number-average primary particle size of the inorganic fine particles for use in the invention, when the fine particles are too small, then their characteristics intrinsic to the substance constituting them may change; but on the contrary, when the number-average primary particle size is too large, then the Rayleigh scattering of the particles may be remarkable and the transparency of the organic-inorganic hybrid composition may greatly lower. Accordingly, the lowermost limit of the number-average primary particle size of the inorganic fine particles for use in the invention is preferably at least 1 nm, more preferably at least 2 nm, even more preferably at least 3 nm; and the uppermost limit thereof is preferably at most 15 nm, more preferably at most 10 nm, even more preferably at most 7 nm. Specifically, the number-average primary particle size of the inorganic fine particles in the invention is preferably from 1 nm to 15 nm, more preferably from 2 nm to 10 nm, even more preferably from 3 nm to 7 nm.

Preferably, the inorganic fine particles for use in the invention satisfy the above-mentioned mean particle size and have a narrower particle size distribution. The monodispersed particles of the type may be defined variously, and for example, the numerical definition range described in JP-A 2006-

160992 may apply to the particle size distribution range preferred for the fine particles for use in the invention.

The number-average primary particle size as referred to herein can be determined, for example, using an X-ray diffractiometry (XRD) apparatus or a transmission electronic microscope (TEM).

The refractive index of the inorganic fine particles for use in the invention is not specifically defined. In case where the organic-inorganic hybrid material of the invention is used for optical members that are required to have a high refractivity, then the inorganic fine particles preferably have high refractivity characteristics. In this case, the refractive index of the inorganic fine particles is preferably from 1.65 to 3.0 at 22° C. and at a wavelength of 589 nm, more preferably from 1.7 to 2.7, even more preferably from 1.75 to 2.5. When the refractive index of the fine particles is at most 3.00, then the refractivity difference between the particles and the thermoplastic resin may be relatively small and therefore Rayleigh scattering of the particles may tend to be reduced. When the refractive index is at least 1.65, then the particles may be effective for refractivity increase.

The refractive index of the inorganic fine particles may be estimated, for example, according to a method comprising shaping a composition produced by hybridizing the particles with the thermoplastic resin for use in the invention into a transparent film, measuring the refractive index of the film with an Abbe's refractiometer (e.g., Atago's "DM-M4"), separately measuring the refractive index of the resin alone, and processing the data through computation, or a method comprising measuring separately the refractive index of fine particle dispersions having a different concentration and processing the data through computation to thereby determine the refractive index of the fine particles. Also employable is another method comprising forming a thin film of the inorganic fine particles on a substrate having known optical properties such as a silicon wafer or the like, through spin coating thereon, then fully drying it and determining the refractive index thereof through fitting to interference patterns with an ellipsometer.

The content of the inorganic fine particles in the organic-inorganic hybrid material of the invention is preferably from 10 to 80% by mass, more preferably from 15 to 70% by mass, even more preferably from 20 to 60% by mass, from the viewpoint of the transparency and the high refractivity of the hybrid material.

(Additives)

Various additives may be suitably added to the organic-inorganic hybrid material of the invention, in addition to the indispensable ingredients in the invention, that is, the above-mentioned thermoplastic resin and inorganic fine particles, from the viewpoint of the uniform dispersibility, the flowability and the mold releasability in molding, the weather resistance, etc.

The amount of the additives to be in the hybrid material varies depending on the object thereof. Preferably, the amount is from 0 to 50% by mass relative to the sum total of the inorganic fine particles and the thermoplastic resin, more preferably from 0 to 30% by mass, even more preferably from 0 to 20% by mass.

<Dispersant>

In the invention, any other dispersant than the above-mentioned thermoplastic resin may be added in mixing the inorganic fine particles dispersed in water or in an alcohol solvent, with the thermoplastic rein as described below, for various purposes, for example, for increasing the extrability or substitutability in an organic solvent, for increasing the uniform dispersibility in the thermoplastic resin, for lowering the water absorbability of the fine particles, or for enhancing the weather resistance of the hybrid material. Preferably, the weight-average molecular weight of the dispersant is from 50 to 50,000, more preferably from 100 to 20,000, even more preferably from 200 to 10,000.

Preferred examples of the dispersant for use in the invention include, for example, p-octylbenzoic acid, p-propylbenzoic acid, acetic acid, propionic acid, cyclopentanecarboxylic acid, dibenzyl phosphate, monobenzyl phosphate, diphenyl phosphate, di-α-naphthyl phosphate, phenylphosphonic acid, monophenyl phenylphosphonate, KAYAMER PM-21 (Nippon Kayaku's trade name), KAYAMER PM-2 (Nippon Kayaku's trade name), benzenesulfonic acid, naphthalenesulfonic acid, paraoctylbenzenesulfonic acid, as well as silane coupling agents described in JP-A 5-221640, 9-100111 and 2002-187921, to which, however, the invention should not be limited.

One or more different types of such dispersants may be used either singly or as combined.

The total amount of the dispersants to be added is preferably from 0.01 to 2 times by mass the amount of the inorganic fine particles added, more preferably from 0.03 to 1 time by mass, even more preferably from 0.05 to 0.5 times by mass.

<Plasticizer>

In case where the glass transition temperature of the thermoplastic resin for use in the invention is high, the composition is not always easy to shape. For this, a plasticizer may be added to the composition of the invention for the purpose of lowering the shaping temperature of the composition. The amount of the plasticizer to be added, if any, may be preferably from 1 to 50% by mass of the total amount of the organic-inorganic hybrid material, more preferably from 2 to 30% by mass, even more preferably from 3 to 20% by mass. The plasticizer for use in the invention must be selected totally in consideration of the compatibility thereof with resin, the weather resistance and the plasticization effect thereof, and for example, it may be selected from various known plasticizers described in JP-A 2007-238929, etc.

<Other Additives>

A known mold releasing agent such as modified silicone oil or the like may be added to the composition in addition to the ingredients mentioned above, for the purpose of enhancing the shapability of the composition; or for the purpose of enhancing the light resistance and the thermal degradation resistance thereof, a known antioxidant such as a hindered phenol-type, amine-type, phosphorus-containing, thioether-type or the like antioxidant may be suitably added thereto. Preferably, the amount of the additive of the type, if any, may be from 0.1 to 5% by mass or so of the total solid content of the organic-inorganic hybrid material.

[Manufacturing Method of Organic-Inorganic Hybrid Material]

The inorganic fine particle to be used in the invention is bound with the thermoplastic resin having the foregoing functional group and dispersed in the resin to obtain the organic-inorganic hybrid material of the invention.

Since the inorganic fine particle to be used in the invention is small in particle size and high in surface energy, when isolated as a solid, it is difficult to be re-dispersed. Therefore, it is preferable that the inorganic fine particle is mixed with the foregoing thermoplastic resin in a dispersed state in a solution to form a stable dispersion. Preferred examples of the manufacturing method of the hybrid material include (1) a method in which an inorganic fine particle is surface treated in the presence of the foregoing dispersant, the surface-treated inorganic fine particle is extracted into an organic solvent, and the extracted inorganic fine particle is uniformly mixed with the foregoing thermoplastic resin to manufacture a hybrid material of the inorganic fine particle and the thermoplastic resin; and (2) a method in which inorganic fine particles and a thermoplastic resin are uniformly mixed using a solvent capable of uniformly dispersing or dissolving both components therein to manufacture a hybrid material of the inorganic fine particle and the thermoplastic resin.

In the case where an organic-inorganic hybrid material of the inorganic fine particle and the thermoplastic resin is manufactured by the foregoing method (1), a water-insoluble solvent such as toluene, ethyl acetate, methyl isobutyl ketone, chloroform, dichloroethane, dichloromethane, chlorobenzene and methoxybenzene is used as the organic solvent. Though the dispersant to be used for extracting the inorganic fine particle into the organic solvent and the thermoplastic resin may be the same kind or a different kind, as to the dispersant to be preferably used, those described above in the (Dispersant) section are exemplified.

In mixing the inorganic fine particle extracted into the organic solvent and the thermoplastic resin, additives such as a plasticizer, a releasing agent and a polymer of other type may be added as the need arises.

In the case where the foregoing method (2) is employed, a single or mixed solvent of hydrophilic polar solvents (for example, dimethylacetamide, dimethylformamide, dimethyl sulfoxide, benzyl alcohol, cyclohexanol, ethylene glycol monomethyl ether, 1-methoxy-2-propanol, tert-butanol, acetic acid, propionic acid) is preferably used as the solvent. Alternatively, a mixed solvent of a water-insoluble resin (for example, chloroform, dichloroethane, dichloromethane, ethyl acetate, methyl ethyl ketone, methyl isobutyl ketone, toluene, chlorobenzene, methoxybenzene) and the foregoing polar solvent is preferably used as the solvent. On that occasion, apart from the foregoing thermoplastic resin, a dispersant, a plasticizer, a releasing agent or a polymer of other type may be added as the need arises. In using inorganic fine particle dispersed in water/methanol, it is preferable that after adding a hydrophilic solvent capable of dissolving the thermoplastic resin therein at a higher boiling point than that of water/methanol, the water/methanol is concentrated and distilled off, thereby substituting a dispersion of the inorganic fine particle into the polar organic solvent, followed by mixing with the resin. On that occasion, the foregoing dispersant may be added.

The solution of the organic-inorganic hybrid material obtained in the foregoing method (1) or (2) can be subjected to cast molding as it is, to obtain a shaped article. However, in the invention, it is especially preferable that after removing the solvent from the solution by a method such as concentration (e.g. spray-drying, concentration under a reduced pressure), freeze-drying and reprecipitation from an appropriate poor solvent, a powdered solid is molded by a method such as injection molding and compression molding.

[Shaped Articles]

By molding the organic-inorganic hybrid material of the invention described above, the shaped article of the invention can be produced. The shaped article of the invention has the refractive index and the optical properties as described in the column about the organic-inorganic hybrid material, and is therefore useful.

The shaped articles of the invention preferably have a maximum thickness of 0.1 mm or more, more preferably 0.1 to 5 mm, still more preferably 1 to 3 mm. The shaped articles of such thickness are particularly useful as an optical component with a high refractive index. Shaped articles of such thickness are generally produced, with much difficulty, by solution cast methods, because the solvent therein can hardly be drawn out. When the organic-inorganic hybrid material of the invention is used, however, molding is readily done to readily prepare complicated shapes such as non-spherical shapes. As described above, in accordance with the invention, shaped articles with good transparency can be obtained, using the large refractive index properties of the fine particles.

[Optical Components]

The foregoing article is an article having high refraction properties, light transmission properties and lightweight properties and having excellent optical properties. The optical component of the invention is configured of such an article. The type of the optical component of the invention is not particularly limited. In particular, the optical component of the invention can be favorably utilized as an optical component utilizing excellent optical properties of the organic-inorganic hybrid material, especially as an optical component capable of transmitting light therethrough (so-called passive optical component). Examples of optical functional devices provided with such an optical component include a variety of display devices (for example, liquid crystal displays, plasma displays), a variety of projector devices (for example, OHP, liquid crystal projectors), optical fiber communication devices (for example, optical waveguides, optical amplifiers) and imaging devices (for example, cameras, video cameras).

Also, examples of the passive optical component to be used in an optical functional device include lenses, prisms, panels (plate-like moldings), films, optical waveguides (for example, film forms, fiber forms) and optical discs. If desired, such a passive optical component may be of a multilayered structure provided with an arbitrary coating layer such as arbitrary additional functional layers, for example, a protective layer for preventing mechanical damages on the coated surface due to friction or abrasion, a light absorbing layer for absorbing light beams of an undesired wavelength which become a cause for deteriorating the inorganic particle or base material or the like, a transmission-blocking layer for suppressing or preventing the transmission of a reactive low-molecular weight molecule such as water and an oxygen gas, an antiglare layer, an antireflection layer and a low-refractive index layer. Specific examples of such an arbitrary coating layer include a transparent conductive membrane or a gas barrier membrane composed of an inorganic oxide coating layer; and a gas barrier membrane or a hard coat composed of an organic material coating layer. As the coating method, there can be employed known coating methods such as a vacuum vapor deposition method, a CVD method, a sputtering method, a dip coating method and a spin coating method.

[Lens]

The optical component using the organic-inorganic hybrid material of the invention is especially favorable for a lens base material. The lens base material manufactured using the organic-inorganic hybrid material of the invention has high refraction properties, light transmission properties and lightweight properties and is excellent in optical properties. Also, by properly adjusting the type of the monomer constituting the organic-inorganic hybrid material and the amount of the inorganic fine particle to be dispersed, it is possible to arbitrarily adjust the refractive index of the lens base material.

The "lens base material" as referred to in the invention refers to a single member capable of exhibiting a lens function. A membrane or a member can be provided on the surface or surroundings of the lens base material depending upon the use circumference or utilization of the lens. For example, a protective membrane, an antireflection membrane, a hard coat membrane and the like can be formed on the surface of the lens base material. Also, the surroundings of the lens base material can be put in and fixed to a base material holding frame or the like. However, such a membrane or frame is a member to be added to the lens base material as referred to in the invention and should be distinguished from the lens base material per se as referred to in the invention.

In utilizing the lens base material in the invention as a lens, the lens base material per se of the invention may be solely used as a lens, or as described previously, it may be added to a membrane or frame and then used as a lens. The type and shape of the lens using the lens base material of the invention is not particularly limited. The lens base material of the invention is used for, for example, spectacle lenses, optical instrument lenses, optoelectronic lenses, laser lenses, pickup lenses, vehicle-mounted camera lenses, mobile phone camera lenses, digital camera lenses, OHP lens, lenses for configuring a micro lens array.

EXAMPLES

The characteristics of the invention are hereunder described in more detail with reference to the following Examples. Materials, use amounts, proportions, treatment contents, treatment procedures and the like as shown in the following Examples can be properly changed. In consequence, it should not be construed that the scope of the invention is limitedly interpreted.

[Analysis and Evaluation Methods]
In the following Examples, the respective analysis and evaluation methods were carried out in the following manners.
(1) Measurement of X-Ray Diffraction (XRD) Spectrum:
The measurement was carried out at 23° C. using "RINT 1500", manufactured by Rigaku Corporation (X-ray source: copper Kα rays, wavelength: 1.5418 angstroms)
(2) Observation by Transmission Electron Microscope (TEM):
The observation was carried out by "H-9000 UHR model transmission electron microscope", manufactured by Hitachi, Ltd. (accelerating voltage: 200 kV, degree of vacuum at the time of observation: about $7.6 \times 10^{-9}$ Pa).
(3) Measurement of Light Transmittance:
A resin to be measured was molded to prepare a substrate having a thickness of 1.0 mm, which was then measured for light transmittance using a spectrophotometer for ultraviolet and visible region (UV-3100, manufactured by Shimadzu Corporation).
(4) Measurement of Refractive Index:
The measurement was carried out by light at a wavelength of 589 nm using an Abbe's refractometer ("DR-M4", manufactured by Atago Co., Ltd.).
(5) Measurement of Molecular Weight:
The molecular weight is a weight-average molecular weight measured in terms of polystyrene through GPC under the condition mentioned below.
Apparatus: HLC-8121GPC/HT (by Tosoh),
Column: $TSK_{gel}$ $GMH_{HR}$-H(20)HT (7.8 mm×300 mm), 2 columns,
Detector: RI detector with built-in HLC-8221GPC/HT,
Solvent: o-dichlorobenzene,
Flow rate: 1 mL/min,
Temperature: 145° C.,
Sample amount: 500 μL (0.2% solution),
Standard sample: monodispersed polystyrene×16 (by Tosoh).
(6) Measurement of Glass Transition Temperature (Tg):
Using a differential scanning calorimeter (DSC6200, by Seiko Instruments), Tg of each sample was measured in nitrogen under a heating condition of 10° C./min. Tg as defined in this description is one measured according to the method.

[Preparation of Inorganic Fine Particle Dispersion]
(1) Preparation of Aqueous Zirconium Oxide Dispersion:
A zirconium oxychloride solution having a concentration of 50 g/L was neutralized with an aqueous 48% sodium hydroxide solution to prepare a zirconium hydrate suspension. The suspension was filtered, and washed with ion-exchanged water to give a zirconium hydrate cake. The cake was controlled to have a zirconium oxide concentration of 15% by mass, using ion-exchanged water as a solvent, then put into an autoclave, in which this was processed for hydrothermal treatment at 150° C. for 24 hours under a pressure of 150 atmospheres to give a suspension of zirconium oxide fine particles. Through TEM, formation of zirconium oxide fine particles having a number-average particle size of 5 nm was confirmed.

(2) Preparation of Zirconium Oxide/Butyl Acetate Dispersion:
P-n-propylbenzoic acid (15 g) and butyl acetate (1000 g) were added to the zirconium oxide dispersion (15% by mass aqueous dispersion, 500 g) prepared in the above (1), and concentrated under reduced pressure to be at most about 1000 g for solvent substitution, and then butyl acetate was added thereto for concentration control thereby giving a zirconium oxide/butyl acetate dispersion (2) having a concentration of 6.7% by mass.

[Production of Thermoplastic Resin]
(1) Production of Thermoplastic Resin (P-1, P-4, P-6, P-8, Comparative Polymer B):

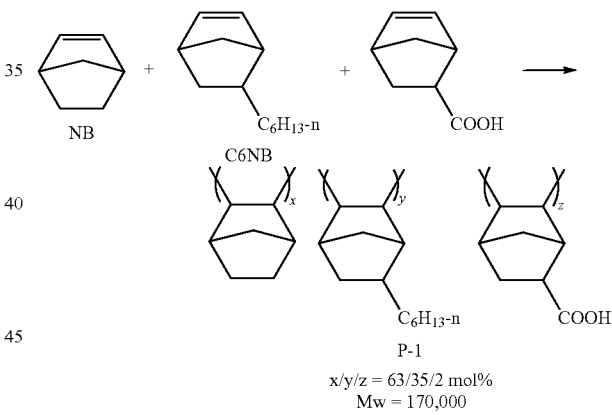

Toluene (800 mL), hexylnorbornene (C6NB) (64.2 g, 0.36 mol), norbornene (NB) (64.0 g, 0.68 mol), norbornenecarboxylic acid (NBCOOH) (11.1 g, 0.08 mol) and, as a molecular weight-controlling agent, 1-octene (53.9 g, 0.48 mol) were put into a reactor. Next, a solution prepared by reacting palladium bisacetylacetonate (by Tokyo Kasei) (54.9 mg) and tricyclohexyl phosphine (by Strem) (50.5 mg) in toluene (5 mL) was added thereto, followed by washing with toluene (2.9 mL). Next, dimethylanilinium tetrakis-pentafluorophenyl borate (by Strem) (288 mg) was added thereto, followed by washing with toluene (7 ml). The solution was stirred in a nitrogen current at 80° C. for 3 hours. The resulting solution was diluted with toluene (2 L) and hexane (3 L), and then acetone (12 L) was added thereto for reprecipitation. The resulting precipitate was collected through filtration, and dried in vacuum at 80° C. for 3 hours to give a white solid P-1.

The thermoplastic resin P-1 was dissolved in heavy chloroform and analyzed through $^1$H-NMR. As a result, the copolymerization ratio of the resin was 63/35/2 mol %. The obtained resin was dissolved in o-dichlorobenzene, and analyzed through gel permeation chromatography (GPC) for measurement of the molecular weight thereof. As a result, the weight-average molecular weight (Mw) of the resin in terms of polystyrene was 170,000. Tg of the resin measured through DSC was 230° C. The refractive index (nD) of the resin, as measured with an Abbe's refractometer at a wavelength of 589 nm, was 1.531, and the Abbe's number (υD) thereof was 55. The refractive index and the Abbe's number were measured as a 200-μm thick film of the resin P-1 formed by thermal compression molding of the resin.

Other polymers P-4, P-6 and P-8 mentioned below, and polymer B not having a functional group capable of bonding to a functional group were produced according to the same production method as that for the above polymer P-1, for which, however, the type of the monomer, the monomer concentration, the catalyst concentration and the concentration of the molecular weight-controlling agent were changed. The obtained polymers P-1, P-4, P-6 and P-8 all had a light transmittance of at least 80%.

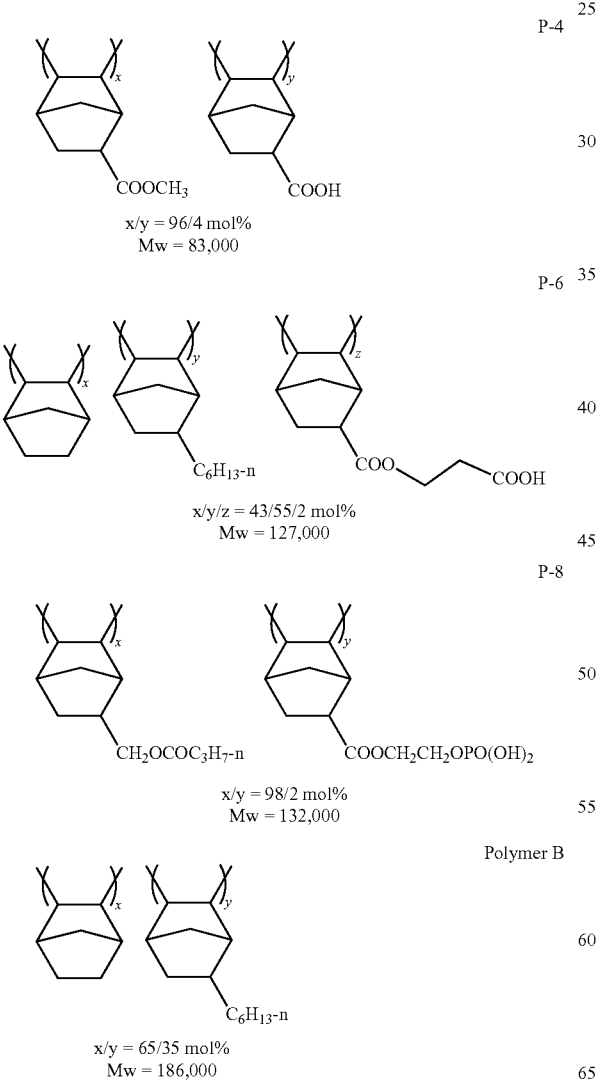

(2) Production of Comparative Polymer A, Comparative Polymer C and Comparative Polymer D:

Polymer A described in JP-A 2003-73564, Polymer C described in JP-A 2007-238929 and Polymer D described in WO2005-73310 as resin (2) were produced as already reported.

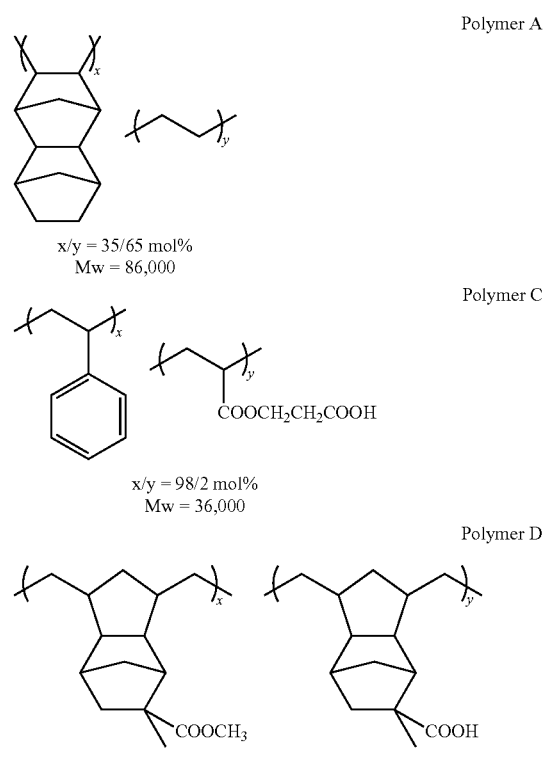

Example 1

Preparation of Hybrid Material and Production of Transparent Shaped Article (1) Preparation of Organic-Inorganic Hybrid Material:

The thermoplastic resin P-1 was mixed with the zirconium oxide fine particles/butyl acetate dispersion (2) prepared in the above in such a manner that the solid content of the $ZrO_2$ fine particles in the resulting mixture could be 30% by mass. In this, the resin P-1 was previously formed as a 2% solution thereof in a mixed solvent of chlorobenzene and THF (9/1), and the zirconium oxide dispersion was dropwise added thereto and mixed. After thus mixed, the resulting mixture was heated at 80° C. for 1 hour, then the solvent was evaporated away to concentrate the mixture, and the resulting solid was dried in vacuum at 140° C. for at least 3 hours until the solvent content could reach at most 1% by mass, thereby producing an organic-inorganic hybrid material with P-1 as a white powder. Tg of the thus-produced organic-inorganic hybrid material was higher than Tg of the original P-1. The white powder was put into a mold and compression-molded under heat (temperature, 340° C.; pressure, 13.7 MPa; time, 2 minutes) thereby giving a transparent shaped article having a thickness of 1 mm. Thus obtained, the shaped article was analyzed to measure the light transmittance and the refractive index thereof. The results are shown in Table 1 below. The hybrid material was evaluated in point of the mold releasability of the shaped article thereof and the in-mold residue remaining in the mold after the article was taken out of the mold, based on the criteria mentioned below. As a result, the shaped article of the hybrid material had good mold releasability, and it gave little in-mold residue after released from the mold. The results are shown in Table 1 below.

(1) Mold Releasability:

After thermally molded, the shaped article was released form the stainless mold, whereupon it was evaluated through sensory evaluation in point of the easiness in releasing the button from the mold, according to the criteria mentioned below.

○: The button was released spontaneously from the mold.

Δ: The button was released from the mold when a little force was applied thereto.

x: The button could be released only when much force was applied thereto.

(2) In-Mold Residue:

After thermally molded, the shaped article was released from the stainless mold, whereupon the mold was checked for the in-mold residue, if any, according to the criteria mentioned below.

○: No in-mold residue remained.

Δ: A little in-mold residue remained.

x: Much in-mold residue remained.

Examples 2 to 6, and Comparative Examples 1 to 4

According to the same method as in Example 1, organic-inorganic hybrid materials with any of the polymer P-4, P-6 or P-8, or the comparative polymer A, polymer B or polymer C were prepared. In Examples 5 and 6, organic-inorganic hybrid materials were prepared with use of a butyl acetate dispersion of aluminum oxide fine particles (number-average particle size was 15 nm and concentration was 6.7% by mass) prepared by a similar method, instead of zirconium oxide fine particles used above, in combination with the polymer P-1 or P-6.

In Examples 2 to 6 where the thermoplastic resin P-1, P-4, P-6 or P-8 falling within the scope of the invention was used, transparent shaped articles having a thickness of up to 1 mm could be produced with no specific problem. The shaped articles were analyzed for the light transmittance and the refractive index thereof. The results are shown in Table 1 below.

In Comparative Example 1 where the comparative polymer A was used, the mixture partly gave a precipitate while the zirconium oxide dispersion was dropwise added to the resin. Accordingly, the mixture was diluted to double with dichlorobenzene added thereto, and this could gave a white powder. However, the shaped article produced by thermal compression molding of the white powder was not transparent but was cloudy, and in addition, it was brittle and its refractive index could not be measured.

In Comparative Examples 2 and 4 where the comparative polymer B or D was used, respectively, the mixture prepared by dropwise adding the zirconium oxide dispersion to the resin was good and transparent, and it gave a white powder with no problem. However, the shaped article produced by thermal compression molding of the white powder was not transparent but was cloudy, and in addition, it was brittle and its refractive index could not be measured.

In Comparative Example 3 where the comparative polymer C was used, the mixture prepared by dropwise adding the zirconium oxide dispersion to the resin was good and transparent, but when dried at 140° C., it fused in some degree and gave a white block but not a fine powder. The resulting block was ground, and then thermally compression-molded at 200° C. to give a transparent shaped article having a thickness of 1 mm. The shaped article was analyzed for the light transmittance and the refractive index thereof. In Comparative Example 3, the data of the shaped article are also shown along with the evaluation result thereof in Table 1 below.

TABLE 1

| | | Thermoplastic Resin | | | Shaped Article | | | | |
|---|---|---|---|---|---|---|---|---|---|
| | Resin Code | Tg (° C.) | Refractive Index | Abbe's Number | Transmittance (%) | Refractive Index | Abbe's Number | Mold Releasability | In-Mold Residue |
| Example 1 | P-1 | 230 | 1.531 | 55 | 79 | 1.571 | 55 | ○ | ○ |
| Example 2 | P-4 | 268 | 1.526 | 57 | 80 | 1.572 | 55 | ○ | ○ |
| Example 3 | P-6 | 234 | 1.535 | 56 | 79 | 1.578 | 54 | ○ | ○ |
| Example 4 | P-8 | 186 | 1.522 | 57 | 81 | 1.568 | 56 | ○ | ○ |
| Example 5 | P-1 | 230 | 1.531 | 55 | 79 | 1.563 | 56 | ○ | ○ |
| Example 6 | P-6 | 234 | 1.535 | 56 | 80 | 1.561 | 57 | ○ | ○ |
| Comparative Example 1 | Polymer A | 135 | 1.541 | 56 | cloudy | immeasurable | immeasurable | Δ | Δ |
| Comparative Example 2 | Polymer B | 227 | 1.532 | 57 | cloudy | immeasurable | immeasurable | Δ | Δ |
| Comparative Example 3 | Polymer C | 105 | 1.589 | 30 | 81 | 1.627 | 27 | x | x |
| Comparative Example 4 | Polymer D | 165 | 1.522 | 53 | cloudy | immeasurable | immeasurable | x | x |

Table 1 confirms that, according to Examples of the invention, hybrid materials satisfying both high refractivity and high Abbe's number and having good heat resistance and excellent transparency can be obtained. Further surprisingly, it is known that the organic-inorganic hybrid materials of Examples 1 to 6 are much superior to those of Comparative Examples 1 to 4 in point of the mold releasability of the shaped articles. The significant improvement in the mold releasability of the hybrid materials with the specific polymer in the invention could not be anticipated from the related prior-art techniques.

The inventors have further confirmed that various lenses such as concave lenses, convex lenses and others can be produced at high producibility and accurately from the organic-inorganic hybrid material of the invention, using various molds for those lenses.

The invention claimed is:

1. An organic-inorganic hybrid material containing inorganic fine particles and a thermoplastic resin, which is produced by mixing a dispersion of the inorganic fine particles and a solution of the thermoplastic resin, wherein the thermoplastic resin is represented by one of the following formulae:

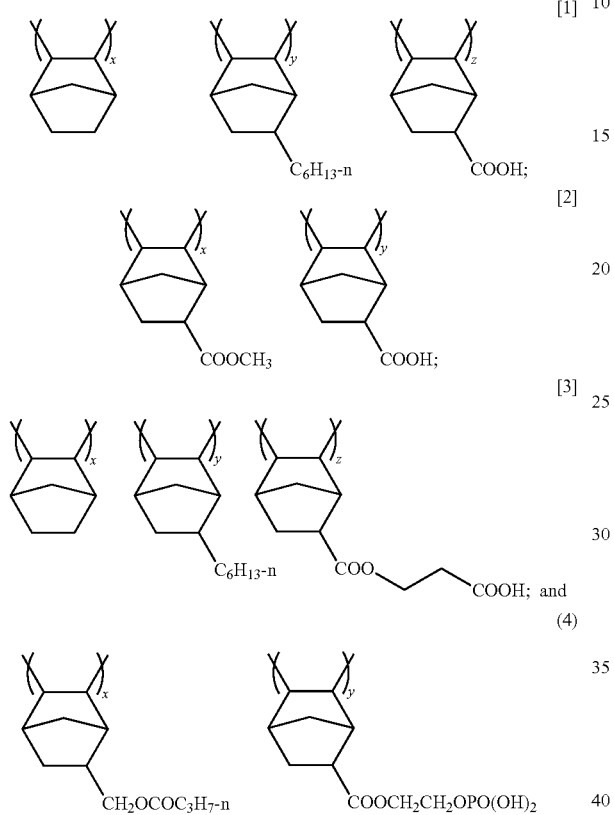

wherein z of [1], y of [2], z of [3] and y of [4] are from 0.1 to 20 mol %, x+y of [1] and [3] and x of [2] and [4] are from 80 to 99.9 mol %, and the thermoplastic resin has a weight-average molecular weight of from 10,000 to 1,000,000.

2. The organic-inorganic hybrid material according to claim 1, wherein the mean primary particle size of the inorganic fine particles is from 1 to 15 nm.

3. The organic-inorganic hybrid material according to claim 1, wherein the inorganic fine particles contains zirconium oxide, aluminum oxide, zinc oxide or titanium oxide.

4. The organic-inorganic hybrid material according to claim 1, which contains the inorganic fine particles in an amount of at least 10% by mass of the organic-inorganic hybrid material.

5. The organic-inorganic hybrid material according to claim 1, of which the light transmittance at a wavelength of 589 nm through a thickness thereof of 1 mm is at least 50%.

6. The organic-inorganic hybrid material according to claim 1, of which the refractive index at a wavelength of 589 nm is at least 1.55.

7. The organic-inorganic hybrid material according to claim 1, of which the Abbe's number is at least 40.

8. A shaped article containing an organic-inorganic hybrid material containing inorganic fine particles and a thermoplastic resin, wherein the thermoplastic resin is represented by one of the following formulae:

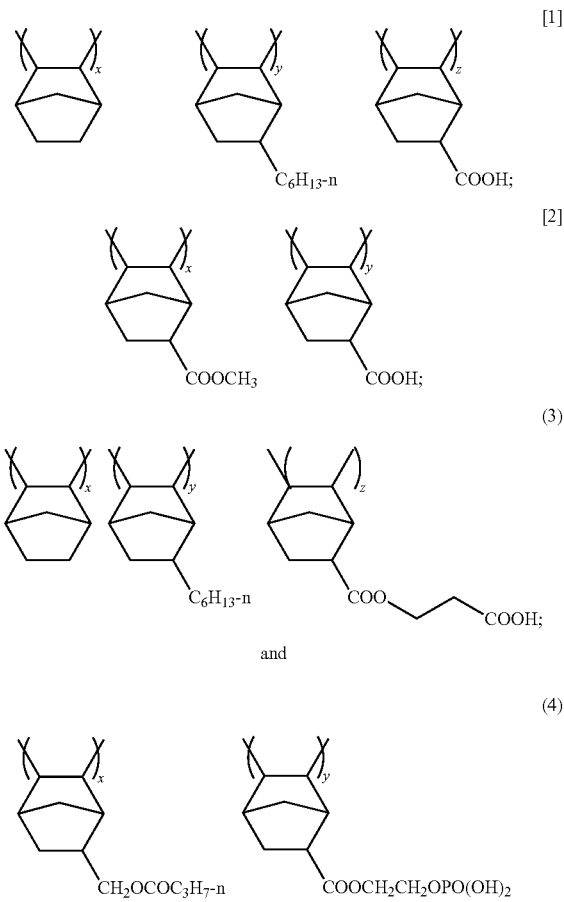

wherein z of [1], y of [2], z of [3] and y of [4] are from 0.1 to 20 mol %, x+y of [1] and [3] and x of [2] and [4] are from 80 to 99.9 mol %, and the thermoplastic resin has a weight-average molecular weight of from 10,000 to 1,000,000.

9. An optical component containing an organic-inorganic hybrid material containing inorganic fine particles and a thermoplastic resin, wherein the thermoplastic resin is represented by one of the following formulae:

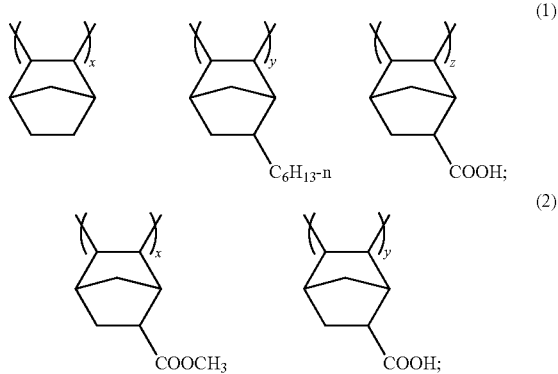

(3)

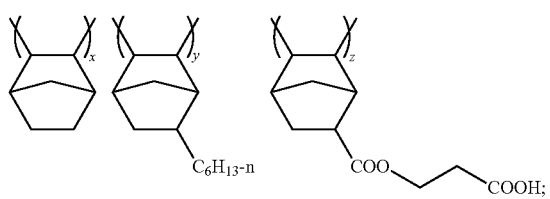

and (4)

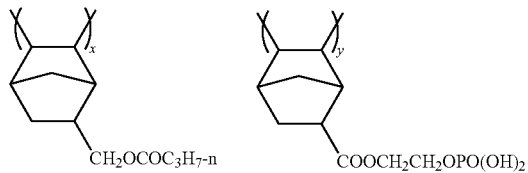

wherein z of [1], y of [2], z of [3] and y of [4] are from 0.1 to 20 mol %, x+y of [1] and [3] and x of [2] and [4] are from 80 to 99.9 mol %, and the thermoplastic resin has a weight-average molecular weight of from 10,000 to 1,000,000.

10. A lens containing an organic-inorganic hybrid material containing inorganic fine particles and a thermoplastic resin, wherein the thermoplastic resin is represented by one of the following formulae:

[1]

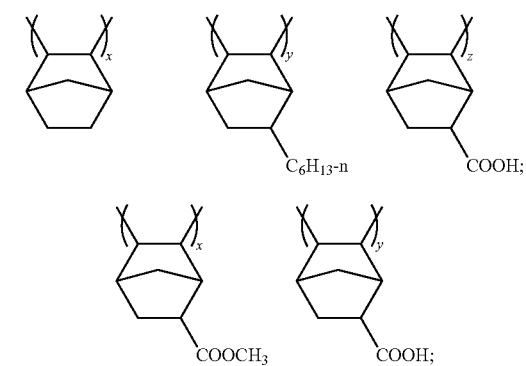

[2]

[3]

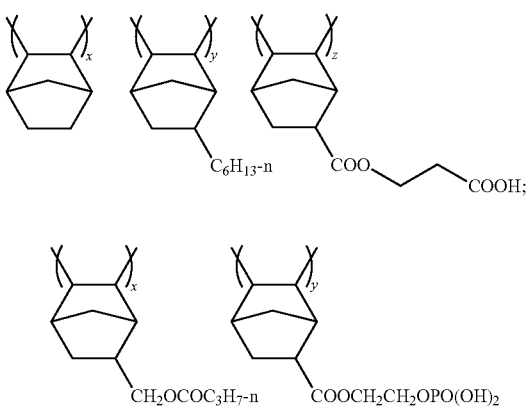

[4]

wherein z of [1], y of [2], z of [3] and y of [4] are from 0.1 to 20 mol %, x+y of [1] and [3] and x of [2] and [4] are from 80 to 99.9 mol %, and the thermoplastic resin has a weight-average molecular weight of from 10,000 to 1,000,000.

11. The organic-inorganic hybrid material according to claim 1, which is produced by mixing a dispersion of the inorganic fine particles and a solution of the thermoplastic resin and removing the solvent by at least one of concentration, freeze-drying or reprecipitation.

12. The organic-inorganic hybrid material according to claim 1, wherein the thermoplastic resin is represented by the following formula:

P-1

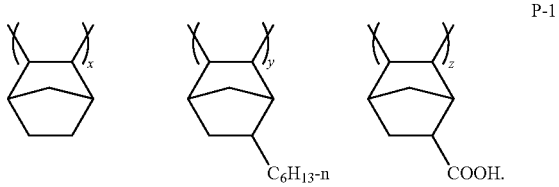

x/y/z = 63/35/2 mol %
Mw = 170,000

13. A method for producing an organic-inorganic hybrid material, comprising mixing a dispersion of inorganic fine particles and a solution of a thermoplastic resin, wherein the thermoplastic resin is represented by one of the following formulae:

[1]

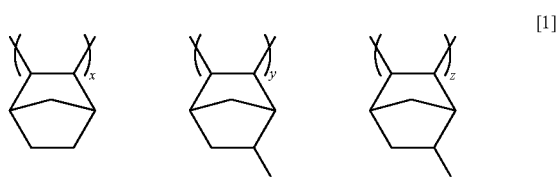

[2]

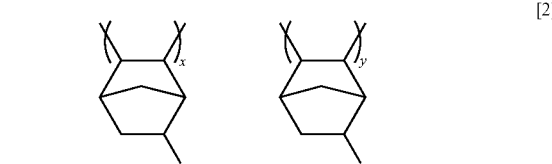

[3]

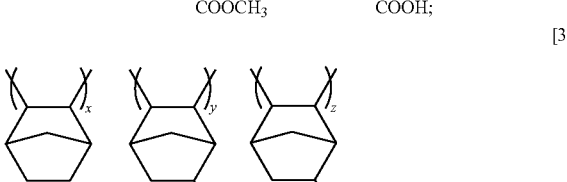

[4]

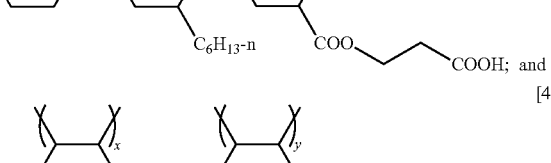

wherein z of [1], y of [2], z of [3] and y of [4] are from 0.1 to 20 mol %, x+y of [1] and [3] and x of [2] and [4] are from 80 to 99.9 mol %, and the thermoplastic resin has a weight-average molecular weight of from 10,000 to 1,000,000.

14. The organic-inorganic hybrid material according to claim 1, wherein z of [1], y of [2], z of [3] and y of [4] are restricted to 0.2 to 10 mol %.

15. The organic-inorganic hybrid material according to claim 1, wherein z of [1], y of [2], z of [3] and y of [4] are restricted to 0.3 to 5 mol %.

16. The organic-inorganic hybrid material according to claim 1, wherein the weight-average molecular weight of the thermoplastic resin is restricted to 30,000 to 500,000.

* * * * *